March 1, 1938.  F. W. GAINES ET AL  2,109,693
RETRIEVABLE SINKER
Filed April 3, 1937
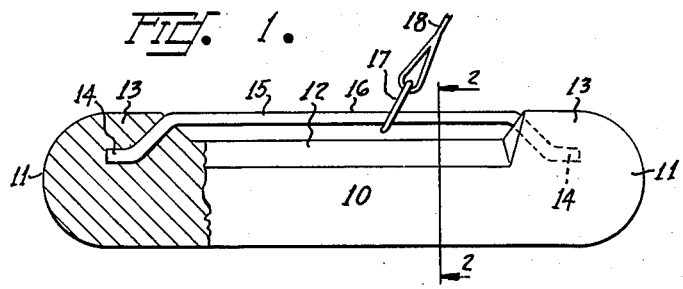
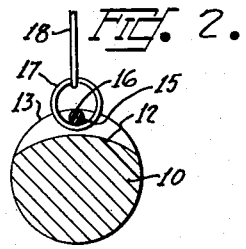
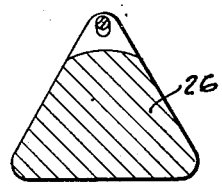
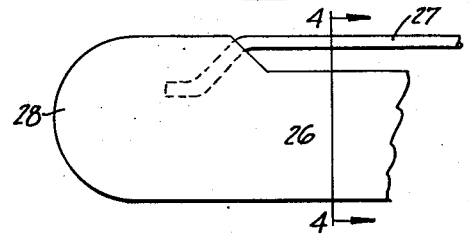
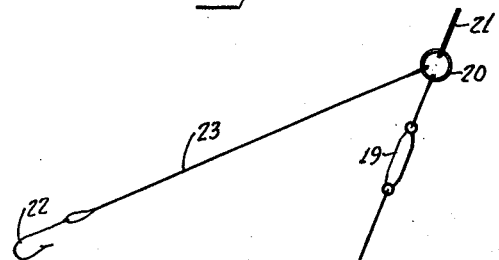
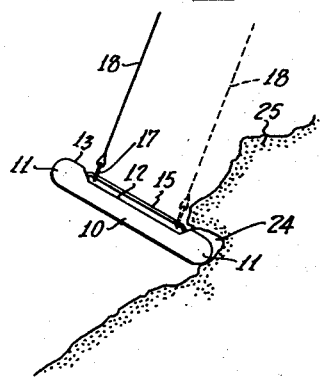
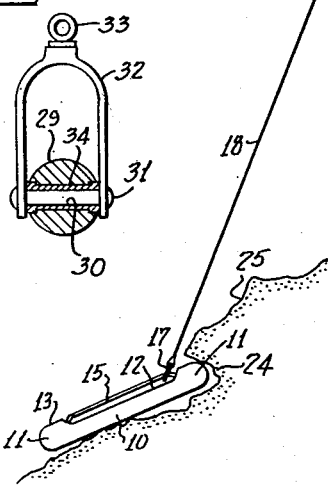
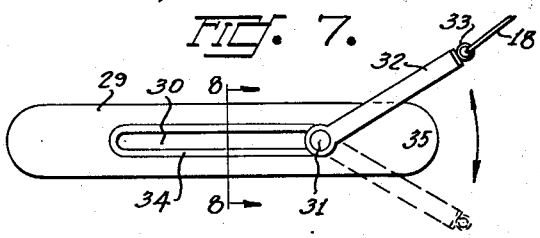
INVENTORS
F. W. GAINES
W. H. WILLIAMS
BY
ATTORNEY.

Patented Mar. 1, 1938

2,109,693

UNITED STATES PATENT OFFICE 2,109,693

RETRIEVABLE SINKER

Floyd W. Gaines and William H. Williams, Portland, Oreg.

Application April 3, 1937, Serial No. 134,810

2 Claims. (Cl. 43—52)

This invention relates generally to sinkers, and particularly to a retrievable sinker.

The main object of this invention is the construction of a sinker for fishing purposes which will make it possible to easily dislodge the sinker after it has become caught on a rock or another object.

The second object is to so construct the sinker that its effectiveness as a sinker will not be lessened and its tendency to become snagged will be greatly lessened.

The third object is to so construct the sinker that it will be easy to manufacture and will stand a great deal of abuse without being rendered inoperative.

These, and other objects, will become more apparent from the specification following as illustrated in the accompanying drawing, in which:

Fig. 1 is a side elevation of the preferred form of the device showing a portion of one end thereof broken away in longitudinal section.

Fig. 2 is a transverse section taken along the line 2—2 in Fig. 1.

Fig. 3 is a fragmentary side elevation of a modified form of the device.

Fig. 4 is a transverse section taken along the line 4—4 in Fig. 3.

Fig. 5 is a view showing a sinker being snagged on a rock.

Fig. 6 is a view similar to Fig. 5 but showing the sinker being freed from the rock.

Fig. 7 is a plan of a modified form of the device.

Fig. 8 is a section taken along the line 8—8 in Fig. 7.

Similar numbers of reference refer to similar parts throughout the several views.

Referring in detail to the drawing, there is shown in Figs. 1 and 2 a somewhat cylindrical body 10 having rounded ends 11. A portion of the body 10 is cut away to form a somewhat flat curved side 12 between the portions 13 of the ends 11. Embedded into each of the portions 13 is the end 14 of a guide wire 15 whose outermost side 16 is substantially tangent to the circumference of the ends 11. On the guide wire 15 is mounted a ring 17 to which is attached a lead wire 18 which is attached to the swivel 19, which in turn is fastended to a ring 20 attached to the fishing line 21.

A hook 22 is attached by means of a leader 23 to the ring 20.

It can be seen in Figs. 5 and 6 that when an end 11 engages a recess 24, for example, in the rock 25 the line 21 is apt to be snagged permanently. A pull on the lead wire 18, however, will cause it to up end the sinker as shown in Fig. 6 permitting the lead wire 18 to move from the dotted position shown in Fig. 6 to the position shown in full lines in the same figure, thereby permitting the sinker to be easily withdrawn in the majority of cases.

In the form of the device shown in Figs. 3 and 4, the body 26 is somewhat triangular in cross-section, but the guide 27 is identical with the guide 15 shown in Fig. 1. The ends 28 are preferably rounded as shown.

In the form of the device shown in Figs. 7 and 8 the body 29 is provided with a slot 30 which extends along the middle portion of the sinker and holds the pin 31 of the clevis 32 which is provided with an eye 33 for attaching the lead wire 18.

It is desirable to line the slot 30 with an insert 34 of a material which is harder than the lead body 29.

It will be noted in the form of the device shown in Fig. 7 that the pin 31 can slide in the slot 30 and that the clevis 32 is long enough to permit it to pass around the end 35, as shown in dotted lines in Fig. 7.

While we have thus illustrated and described our invention, it is not our intention to cover only the precise forms illustrated and described herein, but we do intend to cover all forms and modifications thereof which fall fairly within the appended claims.

We claim:

1. A retrievable sinker consisting of an elongated cylindrical weight having rounded ends and having the intermediate portion thereof cut away on one side, a guide disposed between the ends of the sinker and means for slidably attaching a line to said guide.

2. An elongated cylindrical weight having rounded ends and having one side thereof cut away between its ends, a wire adapted to bridge the gap between said ends and to be secured thereto and means for slidably attaching a line to the portion of said wire between said ends.

FLOYD W. GAINES.
WILLIAM H. WILLIAMS.